United States Patent [19]

Watanabe et al.

[11] Patent Number: 5,542,833

[45] Date of Patent: Aug. 6, 1996

[54] APPARATUS FOR CONTINUOUSLY VULCANIZING RUBBER PRODUCT

[75] Inventors: Shozo Watanabe, Chiba-ken; Kibatsu Shinohara, Kanagawa-ken, both of Japan

[73] Assignee: Kinugawa Rubber Industrial Co., Ltd., Chiba-ken, Japan

[21] Appl. No.: 306,006

[22] Filed: Sep. 14, 1994

Related U.S. Application Data

[63] Continuation of Ser. No. 588,599, Sep. 26, 1990, abandoned.

[30] Foreign Application Priority Data

Sep. 27, 1989 [JP] Japan ..................... 1-251649

[51] Int. Cl.$^6$ ........................................ B28B 5/00
[52] U.S. Cl. .................... 425/71; 425/143; 425/174.4; 425/174.8 E; 425/325
[58] Field of Search ................. 264/25, 26; 425/71, 425/143, 174.4, 174.8 R, 174.8 E, 383, 325, 404, 445, 505, 508

[56] References Cited

U.S. PATENT DOCUMENTS

| | | | |
|---|---|---|---|
| 3,585,258 | 6/1971 | Levinson | 264/26 |
| 3,632,946 | 1/1972 | Soulier | 219/10.55 |
| 3,639,190 | 2/1972 | Brooke et al. | 264/26 |
| 3,699,197 | 10/1972 | Egger | 425/71 |
| 4,275,283 | 6/1981 | Focht | 219/10.55 F |
| 4,298,324 | 11/1981 | Soulier | 425/174.8 E |
| 4,304,744 | 12/1981 | Stroud | 425/174.8 R |
| 4,456,806 | 6/1984 | Arimatsu | 264/26 |
| 4,512,942 | 4/1985 | Babbin et al. | 425/174.4 |
| 4,762,484 | 8/1988 | Ficker | 425/174.8 R |
| 4,859,380 | 8/1989 | Ogata | 425/174.8 R |

FOREIGN PATENT DOCUMENTS

| | | |
|---|---|---|
| 0099993 | 2/1984 | European Pat. Off. . |
| 2606319 | 5/1988 | France . |
| 2926223 | 1/1981 | Germany . |
| 58-163226 | 10/1983 | Japan . |
| 59-96936 | 6/1984 | Japan . |

OTHER PUBLICATIONS

Kautschuk and Gummi Kunststoffe, vol. 40, No. 11, Nov. 1987, pp. 1058–1066.

Primary Examiner—James P. Mackey
Attorney, Agent, or Firm—Bachman & Lapointe, P.C.

[57] ABSTRACT

An apparatus for continuously vulcanizing a rubber molding extruded from an extruder is disclosed in which a single or plural microwave heating apparatus is arranged within a heating bath. The microwave heating apparatus can generate internal heating of the rubber molding so that a surface temperature of the rubber molding can be held at a temperature substantially equal to the internal temperature of the rubber molding. Thus, uniform vulcanization of the rubber molding occurs. In addition, when both the microwave heating apparatus and an external heating source are arranged within the heating bath, an infrared ray radiator, arranged within the heating bath, radiates infra-red rays according to energy absorbed from the microwave heating apparatus and the external heating source. Thus overall heating efficiency can be increased. Furthermore, when single or plural temperature sensors are arranged within the heating bath so as to detect temperatures on particular portions of the rubber molding, an on-and-off control of the microwave heating apparatus is carried out so as to maintain the temperature of the rubber molding on the basis of a previously set temperature.

3 Claims, 1 Drawing Sheet

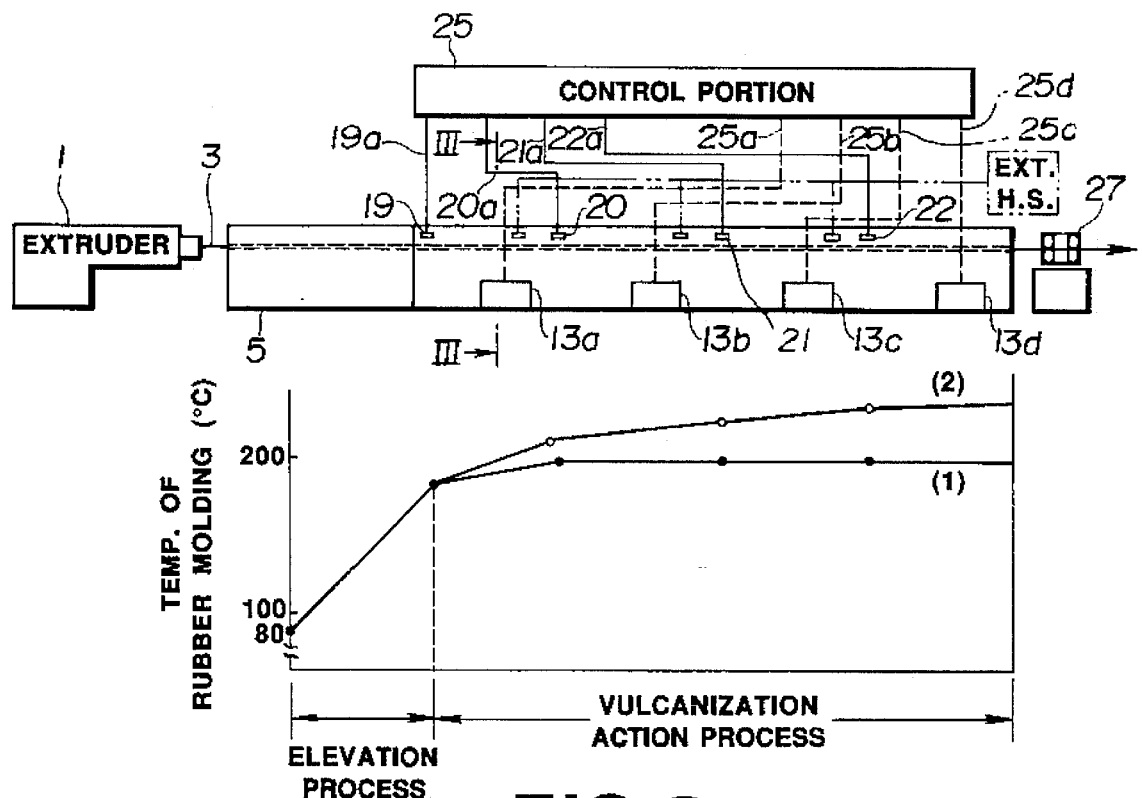
FIG.1
FIG.2
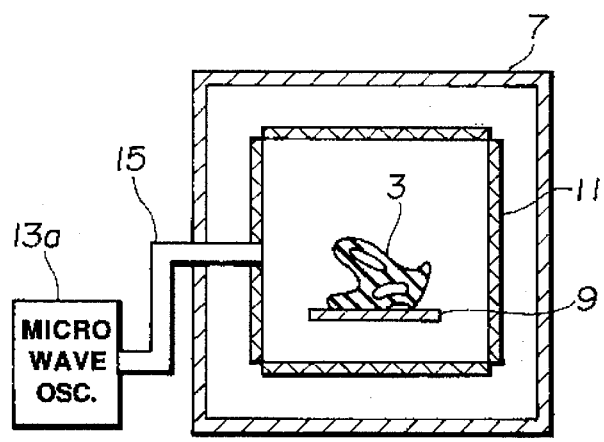
FIG.3

APPARATUS FOR CONTINUOUSLY VULCANIZING RUBBER PRODUCT

This is a Continuation of application Ser. No. 588,599 filed Sep. 26, 1990 abandoned.

BACKGROUND OF THE INVENTION

(1) Field of the Invention

The present invention relates to an apparatus for continuously vulcanizing rubber molding extruded from an extruder which introduces the rubber molding into a heating bath to elevate the temperature of the rubber to a predetermined temperature and accelerates vulcanization by maintaining this temperature.

(2) Background Art

In general, a process of continuously vulcanizing rubber molding includes a process of elevating the temperature of rubber molding extruded from an extruder to a vulcanization temperature and carrying out a vulcanization process while maintaining the temperature. In the latter process, heating sources are used. A heating source includes a hot gas utilized in an electric heater, glass beads, a salt bath, and infrared rays.

The heating sources are arranged at proper intervals in a heating bath through which the rubber molding passes and heat irradiation is carried out on the rubber molding. At this time, utilizing a temperature detection sensor installed on a portion of the heating bath, a temperature within the heating bath is usually maintained at a particular value.

Processes of continuously vulcanizing rubber molding, are exemplified by Japanese Utility Model Registration Application First Publication No. Showa 58-163 226 published on Oct. 31, 1983 and Japanese Patent Application First Publication No. Showa 59-96936 published on Jun. 4, 1984.

However, since external heating sources such as hot gas have been used in such previously proposed apparatus for continuously vulcanizing rubber molding, non-uniform vulcanization may easily occur within the rubber molding. Thus, a problem exists such that deterioration of product characteristics has been brought about.

In more detail, in a case where a product is such that a cross sectional form of the rubber molding extruded from an extruder is large and a particular thickness is maintained, a temperature on a surface area of the rubber is not identical to that in an internal portion of the rubber when heated using the external heating source. In other words, only the temperature on the surface of the formed product becomes high. Consequently, the vulcanization of the rubber becomes non-uniform and the physical characteristics of the product obtained is degraded.

To eliminate such a non-uniformity in the vulcanization, the temperature within the heating source may be maintained at a relatively low temperature so as not to produce heat deterioration of the rubber. In this case the heating operation must be continued for a longer period of time. In such a heating means as described above, heating efficiency from the heating source is low so that a length of the heating bath needs to be elongated. Consequently, the apparatus itself becomes quite large.

Furthermore, since, in a case where the external heating source is used as described above, a responsive characteristic of the temperature on the rubber is slow with respect to the elevating temperature operation of the heating source. Temperature elevation is therefore carried out by e.g., using a microwave path as a heating source, but since hot gas is utilized as a heating source in the heating bath, it is difficult to execute accurate temperature control to maintain the rubber molding at an optimum temperature for vulcanization.

SUMMARY OF THE INVENTION

It is an object of the present invention to provide an apparatus for continuously vulcanizing rubber molding in which the temperature on a surface portion of the rubber is substantially equal to that within the rubber so that uniform vulcanization can occur and which enhances the heating efficiency for the rubber molding and gives a preferable heat responsive characteristic.

The above-described object can be achieved by providing an apparatus for continuously vulcanizing a rubber molding, comprising: a) a heating bath into which rubber molding is introduced from an extruder; and b) at least one heating apparatus, arranged within the heating bath, for heating the rubber molding utilizing output of at least one microwave oscillator, the heating apparatus being used to elevate the temperature of the rubber molding and control and hold the temperature of the rubber molding at a predetermined temperature.

The above-described object can also be achieved by providing an apparatus for continuously vulcanizing the rubber molding, comprising: a) a heating bath into which rubber molding is introduced from an extruder: and b) means, arranged within the heating bath, for directly heating the rubber molding in the heating bath so that a surface temperature of the rubber molding is substantially equal to an internal temperature thereof and held at the same temperature.

BRIEF DESCRIPTION OF THE DRAWINGS

FIG. 1 is a general view of a preferred embodiment of an apparatus for continuously vulcanizing a rubber molding to which the present invention is applicable.

FIG. 2 is a graph showing temperature distribution in a rubber molding in relation to the embodiment of FIG. 1.

FIG. 3 is a cross sectional view of the apparatus for continuously vulcanizing the rubber molding cut away along line III—III of FIG. 1.

DETAILED DESCRIPTION OF THE PREFERRED EMBODIMENT

Reference will hereinafter be made to the drawings in order to facilitate a better understanding of the present invention.

FIG. 1 shows an overall view of an apparatus for continuously vulcanizing a rubber molding to which the present invention is applicable in relation to a temperature distribution graph of the rubber molding in a heating bath.

In FIG. 1, an extruder 1 is installed from which a plasticized rubber product 3 having a predetermined form is continuously extruded.

In FIG. 1, a primary heating bath 5 is used to elevate the temperature of the rubber product 3 entering the heating bath 5 to a constant temperature. The heating bath 5 is set so that the temperature of the rubber product 3 is elevated in the vicinity of about 130° C. by means of a microwave heating apparatus or hot gas blowing apparatus (not shown).

A secondary heating bath 7 is used to execute the vulcanization, the vulcanization being executed with the rubber product 3 on conveyor 9 heated within the heating bath 7 for a constant time, as shown in FIG. 3 which is a cross sectional view of FIG. 1 cut away along line III—III.

An infra-red radiating body 11 is disposed on a position enclosing the rubber product 3. The infra-red radiating body 11 is composed of a substance absorbing energy derived from an oscillating microwave output as will be described later, and generating infra-red rays. Specifically, a silicon carbide ceramic, silica (SiO), Alumina ($Al_2O_3$), or a synthetic ceramic in which another organic compound is mixed with carbon (C) is used.

It is noted that the infra-red ray radiating body 11 has a feature of generating infra-red rays and absorbing energy from an external heating source such as hot gas.

A plurality of microwave oscillators 13a, 13b, 13c, and 13d are arranged on portions adjacent to the heating bath 7. A waveguide 15 (refer to FIG. 3) from the microwave oscillators 13a, 13b, 13c, and 13d are introduced into the inner side of the heating bath 7. A microwave heating apparatus for the rubber molding 3 is constituted by the microwave oscillators 13a, 13b, 13c, and 13d and respective waveguides 15. It is noted that the provided microwave oscillator and waveguide may be plural or single.

In addition, as shown in FIG. 1, temperature detection sensors 19, 20, 21, and 22 are arranged on proper portions of the heating bath 7. Signal lines 19a, 20a, 21a, and 22a introduced from the temperature detection sensors 19, 20, 21, 22 are connected to a control portion 25.

Control lines 25a, 25b, 25c, and 25d introduced from the control portion 25 are connected to microwave oscillators 13a, 13b, 13c, and 13d, respectively. Numeral 27 denotes a tracer for tracing the rubber molding 3 into the next process.

An operation of the continuous vulcanizing apparatus according to the present invention will be explained below.

First, when the rubber molding 3 extruded in the plasticized form from the extruder 1 enters into a heating bath 5, a heating source such as a microwave path or hot gas heats the rubber molding to a temperature at which it is possible to vulcanize the rubber molding 3, e.g., in the vicinity to approximately 180° C.

Next, the rubber molding 3, after preliminary heating, undergoes vulcanization by entering into the heating bath 7.

Oscillation outputs 13a, 13b, 13c, and 13d constituted by Magnetrons are transmitted into the heating baths 7 via waveguides 15 so that part of the microwave energy is absorbed into the rubber molding 3. Most of the microwave energy not absorbed into the rubber molding 3 is absorbed into the infra-red radiator 11 which are then radiated from the radiator 11 to the rubber molding 3.

It is noted that the infra-red radiator 11 has a characteristic that it may absorb energy, even as microwaves or hot gas, and output infra-red rays. Hence, with these external heating sources arranged in the heating bath 7, microwaves and external heating sources such as hot gas may be combined.

Heating the rubber molding 3 with microwaves generated on the basis of the oscillating outputs of the microwave oscillators 13a, 13b, 13c, and 13d can be internally of the rubber molding 3, as different from heating by external heating means such as hot gas. Hence, it is possible to hold a surface temperature of the rubber molding 3 at substantially the same level as the internal temperature of the rubber molding 3.

The temperature detection sensors 19, 20, 21, and 22 installed on proper portions within the heating bath 7 detect temperatures on respective portions of the rubber molding 3 within the heating bath 7. The detected temperature values are transmitted to the control portion 25 via signal lines 19a, 20a, 21a, and 22a. The control portion 25 determines whether the temperatures on the rubber molding 3 are conformed to reference temperature characteristic such as denoted by a graph (1) of FIG. 2.

The control portion 25 then transmits an information signal to the respective microwave oscillators 13a, 13b, 13c, and 13d via control lines 25a, 25b, 25c, and 25d to perform on-and-off control of the respective microwave oscillators. That is to say, in a case where the temperature of a particular portion of the rubber molding 3 is below the reference temperature, the microwave oscillator placed at that portion, or at the next stage, is operated to correct the temperature to the predetermined temperature. It is noted that the graph (2) of FIG. 2 shows an example in which the reference temperature of the rubber molding 3 within the heating bath 7 and setting of a control parameter are modified. The heating temperature for the rubber molding 3 can be selectively set.

In this way, the rubber molding 3 within the heating bath 7 is heated for a constant hour to undergo the vulcanization. After the end of the vulcanization, the rubber molding 3 is transported to the next process via the tracer 27.

As described hereinabove, the continuous vulcanizing apparatus according to the present invention sequentially introduces the rubber molding extruded from the extruder into the heating bath and holds the temperature in an elevated state for the predetermined time so that the vulcanization is executed. Single or plural microwave heating apparata are arranged in the heating bath utilizing outputs of the microwave ocsillators. The microwave heating apparatus controls the temperature elevation of the rubber molding and maintains its temperature. Therefore, as different from heating by external heating energies such as hot gas, internal heating of the rubber molding becomes possible. Hence, since the surface temperature of the rubber molding and internal temperature therein are held at a temperature substantially equal to each other, vulcanization of the rubber molding can be carried out uniformly.

Overall heating efficiency can be enhanced by a combination of microwave heating and external heating within the heating bath.

In addition, since single or plural temperature detection sensors are arranged on proper portions of the heating bath and on-and-off control of the microwave heating apparatus is executed on the basis of the detected temperature at each portion of the rubber molding by means of the temperature detection sensor(s), automatic temperature control can be carried out so that the temperature of the rubber molding 3 conforms to a pre-set temperature.

Furthermore, since the infra-red radiator 11 which absorbs microwave or external heating energy and radiates infra-red rays is installed at the inner surface of the heating bath, the rubber molding 3 is heated directly by means of the microwave energy generated by the microwave heating apparatus (internal heating) and heated externally by means of the infra-red radiator 11 when the microwave energy is not fully absorbed into the rubber molding but is asorbed into the infra-red radiator. Therefore, heating efficiency is enhanced.

Consequently, even though the cross sectional form of the rubber molding is large and is particularly thick, the temperature on the surface of the rubber molding and internal temperature thereof are substantially equal to each other, thus vulcanization becomes uniform and the physical characteristics of the rubber product can be improved. In addition, since the heating efficiency for the rubber molding can be enhanced, the length of the heating bath can be shortened. A small-sized apparatus for continuously vulcanizing can be achieved.

Since, furthermore, the response characteristic of the rubber molding temperature is fast as compared with conventional heating sources, accurate temperature control to maintain the rubber molding at an optimum temperature can be achieved.

It will fully be appreciated by those skilled in the art that the foregoing description has been made in terms of the preferred embodiment and various changes and modifications may be made without departing from the scope of the present invention which is to be defined by the appended claims.

What is claimed is:

1. An apparatus for continuously vulcanizing a rubber molding comprising:

a) a primary heating bath having a microwave heating apparatus associated therewith, said primary bath being located at a position near to an outlet of an extruder and being constructed so that the rubber molding is introduced into said heating bath from the extruder, the temperature of the rubber molding being elevated in said primary heating bath using said microwave heating apparatus at a predetermined gradient of temperature so as to reach a vulcanization temperature;

b) a secondary bath having a plurality of microwave oscillators arranged in line in a lengthwise direction of the secondary bath, said secondary bath being located at a position subsequent to the primary heating bath and being constructed so that the rubber molding after passing through said primary bath passes through said secondary bath and both the inner and outer temperatures of the rubber molding being equally held at a predetermined vulcanization temperature as said rubber molding moves through said secondary bath; and said rubber molding being transported from the secondary bath to further processing, wherein said secondary bath includes a plurality of temperature sensors located along the lengthwise direction of the secondary bath, said sensors being constructed so as to detect the temperatures on respective portions of the rubber molding introduced in the secondary bath and to output temperature signals indicative thereof, wherein said apparatus further includes means for controlling the predetermined vulcanization temperature through the microwave oscillators according to the values of the temperature signals outputted by the temperature sensors in an on-and-off mode so that both the inner and outer temperatures of the rubber molding are equally held at the predetermined vulcanization temperature, which further includes an external heating source associated with the secondary bath, said external heating source being used together with the microwave oscillators to hold said rubber molding temperatures, and wherein the secondary bath includes an inner side adjacent the rubber molding, and the apparatus further includes a radiator which absorbs microwave energy derived from the microwave oscillators and energy from said external heating source and radiates infra-red rays according to the absorbed energies toward the rubber molding, the radiator being arranged on the inner side of the secondary bath.

2. An apparatus as set forth in claim 1, wherein the external heating source generates a hot gas.

3. An apparatus as set forth in claim 1, wherein the infra-red ray radiator is selected from the group consisting of silicon carbide series ceramic, silica, alumina, and synthetic ceramic.

* * * * *